United States Patent [19]

Caullet et al.

[11] Patent Number: 5,171,556
[45] Date of Patent: Dec. 15, 1992

[54] BETA TYPE ZEOLITE AND ITS PREPARATION PROCESS

[75] Inventors: Philippe Caullet, Illzach; Jean-Louis Guth; Anne-Catherine Faust, both of Mulhouse; Francis Raatz, Acheres; Jean-Francois Joly, Paris; Jean-Marie Deves, Rueil Malmaison, all of France

[73] Assignee: Institut Francais du Petrole, Rueil Malmaison, France

[21] Appl. No.: 743,967

[22] Filed: Aug. 12, 1991

Related U.S. Application Data

[63] Continuation of Ser. No. 586,109, Sep. 21, 1990, abandoned.

[30] Foreign Application Priority Data

Sep. 22, 1989 [FR] France .................. 89 12556

[51] Int. Cl.$^5$ .............................................. C01B 33/34
[52] U.S. Cl. ...................................... 423/705; 502/77; 423/718
[58] Field of Search ............... 423/118, 326, 328, 329, 423/330; 502/64, 77

[56] References Cited

U.S. PATENT DOCUMENTS 3,308,069  3/1967  Wadlinger et al. ............... 423/328
3,839,539 10/1974  Elliott, Jr. ............................ 423/329
4,061,717 12/1977  Kerr et al. .......................... 423/329
4,554,145 11/1985  Rubin .................................. 423/328
4,642,226  2/1987  Calvert et al. .................... 423/328

OTHER PUBLICATIONS

Guth et al., "New Route to Pentasil-Type Zeolites Using a Non Alkaline Medium in the Presence of Fluoride Ions", Proc. 7th Int. Zeolite Conf. Tokyo 1986, pp. 121-127.

Primary Examiner—R. Bruce Breneman
Attorney, Agent, or Firm—Millen, White, Zelano and Branigan

[57] ABSTRACT

The object of the invention is a synthetic crystalline zeolite of the beta type characterized by:
a) the following approximate general formula:

$$M_{2/n}O, Al_2O_3, xSiO_2$$

where M represents a proton and/or a metallic cation
n is the valence of M
x is a number ranging from 5 to 800,
b) an X-ray diffraction diagram represented in table I of the description, and
c) a fluorine content ranging from about 0.005 to 2.0% by weight, said zeolite having been furthermore synthetized in a fluoride medium.

11 Claims, No Drawings

BETA TYPE ZEOLITE AND ITS PREPARATION PROCESS

This is a continuation of application Ser. No. 07/586,109 filed Sep. 21, 1990, now abandoned.

BACKGROUND OF THE INVENTION

The invention relates to a new zeolite of the beta type and to a process for preparing this zeolite.

Because of their geometric selectivity and ion exchange properties, zeolites are utilized in industry on a large scale, in adsorption (for example gas drying, separation of linear and branched paraffins, separation of aromatic compounds, etc.) as well as in catalysis (for example catalytic cracking, hydrocracking, isomerization, oligomerization, etc.).

The chemical composition of the zeolites containing in their structure the elements Si and Al can be represented by the following approximate formula:

$$M_{2/n}O, Al_2O_3, xSiO_2$$

where M represents a cation of valence n, such as for example an alkaline, an alkaline-earth or an organic cation, x ranges, according to the structures, between 2 and infinity, in which case the zeolite is a microporous silica.

Although numerous zeolites of the aluminosilicate type do exist in nature, the search for products with new properties has led, the last few years, to the synthesis of a large variety of aluminosilicates of zeolitic structure. A new zeolite, without any known natural equivalent, which was discovered at the end of the seventies, is beta zeolite (U.S. Pat. No. 3,308,069, European Patent 64,328, U.S. Pat. No. 4,061,717). This zeolite is also known as NU-2 (European Patent 55,046). Zeolites of beta type are always syntheized in the presence of sodium cations and of a very limited number of organic structuring agents. In practice, in order to obtain a beta zeolite, it is necessary to start from a reaction mixture containing $Na^+$ and $TEA^+$ (tetraethylammonium) cations.

All the beta type zeolites which have been prepared presently have been synthetized in a conventional medium, that is to say in an alkaline medium with a pH value generally higher than 9, a medium in which the mobilizing agent of the silica is the $OH^-$ anion. Another synthesis medium of the zeolites has been discovered recently: it is the fluoride medium, in which the mobilizing agent of silica is the $F^-$ anion; in this medium, the pH value is generally lower than 10 (see for example J. L. GUTH, H. KESSLER and R. WEY, Proc. 7th Int. Zeolite Conf., Tokyo, Aug. 17-22 1986, p. 121). The synthesis of a limited number of zeolitic structures has already been successful in this new medium, as for example MFI (French Patent Application 88/09,631) and ferrierite (French Patent Application 86/16,362).

In relation to the alkaline synthesis medium ($OH^-$), the fluoride medium shows a certain number of very appreciable advantages. In fact, in an alkaline medium, most synthetized zeolites are metastable: more stable solid phases are therefore likely to appear during the synthesis and unwanted phases may be precipitated. This difficulty increases when large amounts are to be prepared going from the laboratory stage to the industrial stage. Further, the metastable zeolites in the basic reaction medium are obtained only through a strong supersaturation of active species in the medium. This causes a rapid nucleation and consequently leads to small size crystals, the average dimensions of these crystals ranging around one micrometer. Developping crystals with a larger size is therefore difficult in a basic medium. But, in certain applications, it may be desirable to have crystals with a larger size in order to preserve for example the thermal stability of the solid.

Numerous applications, especially in acid catalysis, require zeolites in a proton form and totally free of alkali metal or alkaline-earth metal compensation cations introduced during the synthesis. The proton form can be obtained by carrying out long and repeated ion exchanges with $NH_4^+$ cations for example, followed by calcining in order to decompose these cations into protons. This ion exchange stage could be avoided if it were possible to totally replace the alkali metal or alkaline-earth metal cations with cations decomposable during the synthesis, that is to say $NH_4^+$ and/or organic cations. It is impossible to introduce $NH_4^+$ cations into the solid during the synthesis in a basic medium because the pH value is too high and $NH_4^+$ would then be converted into $NH_3$. Further, syntheses achieved with pH values where the $NH_4^+$ cation is stable are long and difficult because of the poor solubility of the silica sources at such low pH values.

Another advantage of the syntheses achieved in a fluoride medium, in relation to those carried out in a conventional $OH^-$ medium, involves producing solids having acid and ion exchange properties of different nature. The acid catalysts prepared from the solids obtained in a fluoride medium show improved catalytic properties. At this point, it is very important to see that the crystallographic structure of a solid is not sufficient to entirely define its properties particularly the acid properties which play an essential part in catalysis.

Unlike to their homologs prepared according to prior art techniques, beta type zeolites prepared according to the invention contain fluorine after the synthesis stage and also after the removal of the organic compounds introduced during the synthesis. Fluorine, as we shall see further on, gives the beta zeolites according to the invention particular acid and ion exchange properties.

Another important advantage of the fluoride synthesis medium is that it allows obtaining a beta zeolite not only free of sodium cations, but also from the $TEA^+$ cation. This cation is usually introduced into the alkaline synthesis medium by means of the TEAOH base, which is an excessively costly reagent. The possibility, by changing the medium, of preparing a beta zeolite while avoiding this very expensive organic structurer is a positive point.

OBJECT OF THE INVENTION

The object of the invention is thus a new synthetic crystalline zeolite of the beta type, as well as a process for the synthesis of said zeolite in which the disadvantages cited above are avoided, and which also gives the zeolites according to the invention improved properties, particularly acid properties. The new type of zeolite according to the invention can be used in adsorption and in catalysis. The beta type zeolite according to the invention has (after synthesis) the following approximate general formula:

$$M_{2/n}O, Al_2O_3, xSiO_2$$

where M represents a proton and/or a metallic cation (n being the valence of M).

It will be shown hereunder that, in a preparation method according to the invention, said proton or metallic cation results from the thermal decomposition of at least one cation such as for example $NH_4^+$ or/and of at least one organic agent such as methylamine ($CH_3NH_2$) or 1,4 (2,2,2)-diazabicyclo octane (called "DABCO" further on) present in the reaction medium and/or of at least one non decomposable metal cation stemming or not from the reaction medium, such as for example an alkaline and/or an alkaline-earth cation or another metallic cation cited hereafter.

Detailed description of the invention

The zeolite according to the invention is notably characterized by:

i) a number x ranging from 5 to 800, preferably from 7 to 350 (x being the molar ratio $SiO_2/Al_2O_3$)

ii) an X-ray diffraction diagram represented in table I of the description, iii) a fluorine content ranging from about 0.005 to 2.0% by weight, preferably from about 0.01 to 1.5% by weight.

The zeolite is also characterized in that it has been synthetized in a fluoride medium.

This beta type zeolite according to the invention generally shows at least a crystal size ranging from 0.10 to 10 μm and preferably from 0.5 to 10 μm (1 μm = $10^{-6}$ meter).

The invention also relates to a process for preparing said zeolite of the beta type, which involves:

a) forming a dissolved reaction mixture with a pH value lower than about 9 and comprising water, at least one silica source, at least one aluminum source, at least one mobilizing agent containing fluoride ions ($F^-$), at least one source of at least one structuring agent selected from the group consisting of 1,4 (2,2,2)-diazabicyclo octane and a mixture of 1,4 (2,2,2)-diazabicyclo octane and methylamine, this structuring agent possibly supplying organic cations, and otionally a source of alkali metal and/or alkaline-earth, metal cations, said reaction mixture having a composition, expressed in molar ratio, ranging between the following values:

Si/Al: 3-200, preferably 3-100,
$F^-$/Si: 0.1-8, preferably 0.2-6,
$H_2O$/Si: 4-30, preferably 5-20,
(R+R')/Si: 0.5-4,
R/R': 0.1-infinity, preferably 0.2-infinity, where R is the DABCO and R' the methylamine (R'=0 when no methylamine is utilized), b) maintaining said reaction mixture at a heating temperature ranging from about 50° to about 250° C., preferably from about 80° to about 220° C., until a crystalline compound is obtained, and c) calcining said compound at a temperature higher than about 350° C. and preferably higher than about 450° C.

The presence, after the calcination stage (stage c) intended to remove the organic compounds, of fluorine in the zeolites of the beta type according to the invention, at contents preferably ranging from 0.01 to 1.5% by weight, causes changes in the acid and ion exchange properties of the solids. These zeolitic solids are different from the beta zeolites obtained in a conventional medium. In fact, depending on the synthesis conditions, the solids according to the invention are characterized by an infrared vibration spectrum in the OH area (3,800 to 3,500 $cm^{-1}$) which shows bands assigned to the Si-OH groups (3,730-3,750 $cm^{-1}$ area) and to the Al-OH groups (3,580-3,640 $cm^{-1}$) that are less intense than those of the beta zeolites in prior art with the same Si/Al ratio. In correlation, the ion exchange capacity of the zeolites according to the invention in the fluorinated state is generally lower than that of the products in prior art.

The beta zeolites according to having reduced invention, the hydroxyl content and exchange capacity, surprisingly show remarkable acid properties, as can be seen from the ammonia thermodesorption and from the infrared spectroscopy of adsorbed weak bases such as, for example, ethylene or $H_2S$. It is thus clear that the acidity of the solids according to the invention is of a particular nature. Without referring to any particular theory, it can be suggested that, in the solids according to the invention, a more or less important part of the acid sites with a structure of the Al—OH—Si type be replaced by sites of the Al—F—Si type.

The precise nature of the acid sites contained in the beta zeolites according to the invention remains to be clarified; still, it seems that the existence of these particular sites is linked to the presence of fluorine in the solids or at least results from the fact that the synthesis is achieved in a fluoride medium.

Through particular treatments, it would be possible to remove all or part of the fluorine contained in the solids according to the invention without altering their crystallinity. One technique which can be utilized for defluorinating said solids consists in carrying out a treatment in a $NH_4OH$ solution at temperatures ranging for example between the room temperature (15° to 25° C.) and 150° C. (treatment under pressure).

The reaction mixture can be advantageously heated in an autoclave fitted with a polytetrafluoroethylene (PTFE) inner lining between about 50° and about 250° C. and preferably between about 80° and about 220° C., for a duration which may range from several hours to several days (usually 8 to 1,200 hours) according to the chosen reaction temperature, until a crystallized solid is obtained, which is separated from the mother liquors by filtering and which is then washed with distilled water.

Said reaction mixture can be advantageously prepared at a pH value ranging from about 4 to about 9 and, preferably, from about 6 to about 9.

According to a preferred preparation embodiment of the beta zeolites according to the invention, the molar ratios of the reaction mixture constituents range between the following values:

Si/Al:4-20
$F^-$/Si':0.5-4
$H_2O$/Si:5-12
(R+R')/Si:0.9-2.1
R/R':0.3-infinity where R is DABCO (1,4 (2,2,2)-diazabicyclo octane) and R' methylamine ($CH_3NH_2$).

It is possible to add to said reaction mixture at least one additional salt in a molar ratio additional salt to $SiO_2$ generally ranging from 0.1 to 4 and preferably from 0.2 to 0.5 and/or at least one nucleus of the zeolite formed according to the invention in a proportion by weight of zeolite crystal to $SiO_2$ generally ranging from 0.01 to 0.1 and preferably from 0.02 to 0.03, so that the morphology, the crystal size and the kinetics of the crystallization reaction can be advantageously controlled.

It can be advantageously operated in a stirred medium, which may allow considerably decreasing the reaction time.

The pH of the reaction medium of less than about 9 can be obtained either directly from one or several of the reagents used, or by adding an acid, a base, an acid salt, a basic salt or an additional buffer mixture.

Numerous silica sources can be used. The following can be notably cited: silicas in the form of hydrogels, of aerogels, of pseudosolutions, as well as the silicas resulting from the precipitation of soluble silicate solutions or from the hydrolysis of silicic esters such as orthosilicic acid tetraethylic ester $Si(OC_2H_5)_4$ or of complexes such as sodium fluorosilicate $Na_2SiF_6$ or ammonium fluorosilicate $(NH_4)_2SiF_6$.

Among the aluminum sources that are utilized, hydrated aluminum chloride ($AlCl_3$, $6H_2O$), nonahydrated aluminum nitrate ($Al(NO_3)_3$, $9H_2O$), aluminum sulfate with 16 molecules of water or trihydrated aluminum fluoride $AlF_3$, $3H_2O$ will be preferably selected. Pseudoboehmite can also be cited.

Further, instead of starting from separate sources of silica and aluminum, it is also possible to use sources where both elements are combined, such as, for example, a freshly precipitated aluminosilicate gel.

The fluoride anions $F^-$ can be introduced in the form of salts of said structuring agents or of ammonium or of alkaline metals such as, for example, NaF, $NH_4F$, $NH_4HF_2$ or in the form of an acid such as HF or else in the form of hydrolysable compounds that can release fluoride anions in water such as silicon fluoride $SiF_4$ or ammonium fluorosilicate $(NH_4)_2SiF_6$ or sodium fluorosilicate $Na_2SiF_6$.

The acids or acid salts, the bases or basic salts that are possibly added as a complement in order to bring the pH of the reaction medium to the desired value can be selected from the usual acids such as, for example, HF, HCl, $HNO_3$, $H_2SO_4$, $CH_3COOH$ or the acid salts such as, for example, $NH_4HF_2$, $KHF_2$, $NaHSO_4$, the usual bases such as, for example, $NaHCO_3$, $CH_3COONa$, $Na_2S$, NaHS or buffer mixtures such as, for example, ($CH_3COOH$, $CH_3COONa$) or ($NH_4OH$, $NH_4Cl$).

The calcination (stage c) is advantageously achieved at a temperature ranging from about 520° to 800° C. under a dry gas atmosphere, such as for example air or an inert gas, in order to decompose the structuring agent present in the pores of the zeolite.

After the stage of removal of the organic compounds (stage c) and possibly of partial or total defluorination, it is possible to introduce into the zeolite of the beta structure according to the invention, through ion exchange techniques well-known in prior art, at least one element of the periodic table the cations of which can be prepared in an aqueous medium and selected from the family consisting of groups IIA, IIIA, IB, IIIB, IIB, IVB and VIIIA of the periodic table of elements. Examples such as the alkaline and alkaline-earth cations, the rare-earth cations, $Fe^{II}$, $Fe^{III}$, $Co^{II}$, $Co^{III}$, $Ni^{II}$, $Cu^{II}$, $Zn^{II}$, $Ag^{I}$, $Pt^{II}$ can be cited.

Identifying zeolites of the beta type according to the invention can be easily done from their X-ray diffraction diagram. This diffraction diagram can be obtained by means of a diffractometer by using the conventional powder method with the $K\alpha$ radiation of copper. An inner standard allows to precisely determine the values of the angles $2\theta$ associated with the diffraction peaks. The different interreticular distances $d_{nkl}$, characteristic of the sample, are calculated from Bragg's relationship. The measuring error estimation $\Delta$ ($d_{nkl}$) to $d_{nkl}$ is calculated according to the absolute error $\Delta$ ($2\theta$) assigned to the measuring of $2\theta$ by Bragg's relationship. In the presence of an inner standard, this error is minimized and considered usually equal to $\pm 0.05°$. The relative intensity I/Io assigned to each value of $d_{nkl}$ is estimated from the height of the corresponding diffraction peak. The latter one can also be determined from a picture obtained with a Debye-Scherrer chamber. A scale of symbols is often used to characterize this intensity: FF=very strong, F=strong, mF=average to strong, m=average, mf=average to weak, f=weak, ff=very weak.

Table I represents the X-ray diffraction diagram characteristic of the zeolites of the beta type according to the invention. In the $d_{nkl}$ column, the extreme values which can be taken by the different interreticular distances $d_{nkl}$ are represented. Each one of these values must be assigned the measuring error which usually ranges from $\pm 0.07$ to $\pm 0.002$ according to the value of $2\theta$ ($d_{nkl}$ is expressed in Angstroms, $1 \text{ Å} = 10^{-10}$ m).

The zeolite of beta structure according to the invention can be utilized alone or mixed with a matrix within a catalyst.

Said zeolite can for example, after synthesis, be shaped by using a matrix which may be inert or active for the reaction to be promoted. The matrixes that are used are generally selected from the group consisting of clays, aluminas, silica, magnesia, zircon, titanium oxide, boron oxide and any combination of at least two of the compounds cited above, such as silica-alumina, silica-magnesia, etc. All the well-known tableting and shaping methods are applicable, such as for example extrusion, pelleting, oil drop, etc.

The catalyst then shows a proportion by weight of zeolite of the beta type according to the invention generally ranging from 20 to 99.5%, preferably from 40 to 95%, and a proportion by weight of matrix generally ranging from 0.5 to 80%, preferably from 5 to 60%.

The catalyst containing the zeolite of the beta structure according to the invention may also comprise a hydrogenizing or a dehydrogenizing function generally being at least one metal or/and metal compound selected from groups IA, VIB (Cr, Mo, W) and VIII from the periodic table of elements, for example platinum, palladium or/and nickel.

TABLE I

| $2\Theta(°)$ | $d_{hkl}(Å)$ | I/Io |
|---|---|---|
| 7.60 | 11.60 | F |
| 17.30 | 5.12 | ff |
| 18.90 | 4.69 | ff |
| 21.10 | 4.21 | mF |
| 22.25 | 3.99 | FF |
| 25.15 | 3.53 | mf |
| 27.1 | 3.29 | mf |
| 28.5 | 3.129 | mf |
| 29.45 | 3.030 | mf |
| 33.05 | 2.707 | f |
| 34.55 | 2.594 | ff |
| 35.7 | 2.513 | ff |

EXAMPLES

The following examples illustrate the invention without limiting the scope thereof.

EXAMPLE 1

1.4 g of 1,4 (2,2,2)-diazabicyclo octance (DABCO), that is to say $1.25 \ 10^{-2}$ mole, and 0.97 g of an aqueous solution of 40% methylamine, that is to say 1.25 10$^{-2}$ mole of CH$_3$NH$_2$ are added to 0.92 g of distilled water. 1.25 g of an aqueous solution of 40% HF, that is to say 0.025 mole of HF, then 0.90 g of tixolex 28 in the NH$_4$+ form (0.0125 mole of silicon and 1.79 10$^{-3}$ mole of aluminum, that is to say a ratio Si/Al=7) and about 15 mg of carefully crushed H+ form mordenite crystals are successively added to this mixture under stirring.

The molar composition of the reaction mixture is the following:

Si/Al=7; F$^-$/Si=2; NH$_4$+/Si=0.14; (R+R')/Si=2; R/R'=1 and H$_2$O/Si=10 (R and R' respectively represent the DABCO and the methylamine).

After 10 minutes of stirring, the mixture is transferred into a 75 ml-autoclave fitted with a teflon inner lining. Said mixture is maintained at 170° C. for 15 days in a non stirred medium. The solid is separated from the mother liquors by filtering and alternately washed with distilled water and acetone, then dried for 24 hours at 80° C. The X-ray diffraction diagram of the final product is characteristic of the beta zeolite. The crystals are octahedral and their size ranges around 10 μm (1 μm=10$^{-6}$ meter). The atomic ratio Si/Al of the crystals is 16.

EXAMPLE 2

The synthesis conditions are the same as in example 1, except that the H+form mordenite crystals are replaced by crystals of a non decationized beta zeolite synthetized in a basic conventional medium.

The X-ray diffraction spectrum of the obtained product is characteristic of the beta zeolite, the crystals are octahedral and their size is about 1 μm.

EXAMPLE 3

The synthesis conditions are the same as in example 2, except that the molar ratio between the 1,4 (2,2,2)-diazabicyclo octane (DABCO) and the methylamine is DABCO/CH$_3$NH$_2$=0.33.

The X-ray diffraction spectrum of the obtained product is characteristic of the beta zeolite, the crystals are octahedral and their size is about 1 μm.

EXAMPLE 4

1.4 g of 1,4 (2,2,2)-diazabicyclo octane (DABCO) and 0.98 g of an aqueous solution of 40% methylamine are added to 0.92 g of distilled water. 1.25 g of an aqueous solution of 40% HF (0.025 mole of HF), 0.88 g of Merck silica (0.0125 mole of silicon), 0.2 g of pseudoboehmite (0.0025 mole of aluminum) and about 15 mg of non decationized beta zeolite crystals are successively added under stirring.

The reaction mixture shows the following molar composition:

Si/Al=5; (R+R')/Si=2; F$^-$/Si=2; H$_2$O/Si=10 and R/R'=1 (where R and R' respectively represent the DABCO and the methylamine). The pH value of the reaction mixture is about 8.

The reaction mixture is brought to 170° C. for 15 days. The pH value of the reaction mixture is then about 7. The product that is recovered after filtering and washing shows an X-ray diffraction spectrum which is characteristic of the beta zeolite. The crystals are octahedral and their size is about 1 μm.

EXAMPLE 5

33.7 g of 1,4 (2,2,2)-diazabicyclo octane (DABCO), that is to say 0.3 mole, 23.3 g of an aqueous solution of 40% methylamine (0.3 mole of CH$_3$NH$_2$) and 30 g of an aqueous solution of 40% HF, that is to say 0.6 mole of HF, are successively added to 177 g of distilled water. 42.3 g of Merck silica with 15% water, that is to say 0.6 mole of silicon, 3.4 g of pseudoboehmite with 24.6% water, that is to say 0.05 mole of aluminum, and 0.7 g of non decationized beta zeolite crystals are then successively added under stirring.

The reaction mixture has the following molar composition:

Si/Al=12; (R+R')/Si=F$^-$/Si=1; R/R'=1; H$_2$O/Si=20 (where R and R' respectively represent the DABCO and the methylamine).

The pH value of the reaction medium is about 8.5. The reaction mixture is homogenized through stirring for about 30 minutes and then transferred into an autoclave fitted with a teflon inner lining. The reaction mixture is then brought to 170° C. for 15 days, the obtained solid is separated from the mother liquors by filtration (the pH value is close to 8.5), washed with distilled water and dried 24 hours at about 80° C. (a mass of about 45 g of product is obtained). The crystals are octahedral, their size ranges from 1 to 2 μm. The X-ray diffraction spectrum is characteristic of the beta zeolite. The atomic ratio Si/Al of the solid is 17.5, the proportion by weight of fluorine 0.65%.

We claim:

1. A synthetic crystalline zeolite of the beta type having:

a) the following approximate general formula:

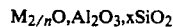

$M_{2/n}O, Al_2O_3, xSiO_2$ where M represents a proton and/or a metallic cation, n is the valence of M, x is a number ranging from 5 to 800, b) an X-ray diffraction diagram as follows:

| 2Θ (°) | d$_{hkl}$ (Å) | I/Io |
|---|---|---|
| 7.60 | 11.60 | F |
| 17.30 | 5.12 | ff |
| 18.90 | 4.69 | ff |
| 21.10 | 4.21 | mF |
| 22.25 | 3.99 | FF |
| 25.15 | 3.53 | mf |
| 27.1 | 3.29 | mf |
| 28.5 | 3.129 | mf |
| 29.45 | 3.030 | mf |
| 33.05 | 2.707 | f |
| 34.55 | 2.594 | ff |
| 35.7 | 2.513 | ff |

FF=very strong, F=strong, mF=average to strong, m=average, mf=average to weak, f=weak, ff=very weak, and c) a fluorine content ranging from about 0.005 to 2.0% by weight, said zeolite being synthesized in a fluoride ion-containing medium.

2. A zeolite according to claim 1 wherein x is a number ranging from 7 to 350.

3. A zeolite according to claim 1 wherein the fluorine content ranges from about 0.01 to 1.5% by weight.

4. A catalyst comprising a zeolite according to claim 1 and a matrix.

5. A catalyst comprising a zeolite according to claim 1, a matrix and at least one metal and/or metal compound selected from groups IA, VIB and VIII of the periodic table of elements.

6. A process for preparing a zeolite, having
  a) the following approximate general formula:

$$M_{2/n}O, Al_2O_3, xSiO_2$$

where M represents a proton and/or a metallic cation,
  n is the valence of M,
  x is a number ranging from 5 to 800,
  b) an X-ray diffraction diagram as follows:

| 2 Θ (°) | $d_{hkl}$ (Å) | I/Io |
|---|---|---|
| 7.60 | 11.60 | F |
| 17.30 | 5.12 | ff |
| 18.90 | 4.69 | ff |
| 21.10 | 4.21 | mF |
| 22.25 | 3.99 | FF |
| 25.15 | 3.53 | mf |
| 27.1 | 3.29 | mf |
| 28.5 | 3.129 | mf |
| 29.45 | 3.030 | mf |
| 33.05 | 2.707 | f |
| 34.55 | 2.594 | ff |
| 35.7 | 2.513 | ff |

FF=very strong, F=strong, mF=average to strong, m=average, mf=average to weak, f=weak, ff=very weak, and
  c) a fluorine content ranging from about 0.005 to 2.0% by weight,
said process comprising:
  1) forming a dissolved reaction mixture with a pH value lower than about 9 and comprising water, at least one silica source, at least one aluminum source, at least one source of a mobilizing agent containing fluoride ions, at least one source of at least one structuring agent, selected from the group consisting of 1,4(2,2,2)-diazabicyclo octane and a mixture of 1,4(2,2,2)-diazabicyclo octane and methylamine, said reaction mixture having a composition, expressed in molar ratio, ranging between the following values:
  Si/Al:3–200
  F/Si:0.1–8
  $H_2O$/Si:4–30
  (R+R')/Si:0.5–4
  R/R':0.1–infinity
  where R is the 1,4(2,2,2)-diazabicyclo octane and R' the methylamine,
  2) maintaining said reaction mixture at a heating temperature ranging from about 50° to about 250° C. until a crystalline compound is obtained, and
  3) calcining said compound at a temperature higher than about 350° C.

7. A process according to claim 6 wherein, in stage 1), said reaction mixture has a composition, expressed in molar ratio, ranging between the following values:
  Si/Al:3–100
  $F^-$/Si:0.2–6
  $H_2O$/Si:5–20
  (R+R')/Si:0.5–4
  R/R':0.2–infinity
  where R is the 1,4 (2,2,2)-diazabicyclo octane and R' the methylamine.

8. A process according to claim 6 wherein, in stage 1), said reaction mixture has a composition, expressed as molar ratios, ranging between the following values:
  Si/Al:4–20
  $F^-$/Si:0.5–4
  $H_2O$/Si:5–12
  (R+R')/Si:0.9–2.1
  R/R':0.3–infinity
  where R is the 1,4 (2,2,2)-diazabicyclo octane and R' the methylamine.

9. A process according to claim 6 wherein, in stage 1), said reaction mixture also comprises a source of alkaline and/or alkaline-earth cations.

10. A process according to claim 6 wherein, in stage 2), said reaction mixture is maintained at a heating temperature ranging from about 80° to 220° C. until a crystalline compound is obtained.

11. A zeolite, having
  (a) the following approximate general formula:

$$M_{2/n}O, Al_2O_3, xSiO_2$$

where M represents a proton and/or organic cation,
  n is the valence of M,
  x is a number from 5 to 800,
  (b) an X-ray diffraction diagram as follows:

| 2 Θ (°) | $d_{hkl}$ (Å) | I/Io |
|---|---|---|
| 7.60 | 11.60 | F |
| 17.30 | 5.12 | ff |
| 18.90 | 4.69 | ff |
| 21.10 | 4.21 | mF |
| 22.25 | 3.99 | FF |
| 25.15 | 3.53 | mf |
| 27.1 | 3.29 | mf |
| 28.5 | 3.129 | mf |
| 29.45 | 3.030 | mf |
| 33.05 | 2.707 | f |
| 34.55 | 2.594 | ff |
| 35.7 | 2.513 | ff |

FF=very strong, F=strong, mF=average to strong, m=average, mf=average to weak, ff=very weak, and
  (c) a fluorine content ranging from about 0.005 to 2.0% by weight,
said zeolite being synthesized by a process comprising:
  1) forming a dissolved reaction mixture with a pH value lower than about 9 and comprising water, at least one silica source, at least one aluminum source, at least one source of a mobilizing agent containing fluoride ions, at least one source of at least one structuring agent, said reaction mixture having a composition, expressed in molar ratio, ranging between the following values:
  Si/Al:3–200
  $F^-$/Si:0.1–8
  $H_2O$/Si:4–30
  (R+R')/Si:0.5–4
  2) maintaining said reaction mixture at a heating temperature ranging from about 50° to about 250° C. until a crystalline compound is obtained, and
  3) calcining said compound at a temperature higher than about 350° C., wherein the structuring agent is 1,4(2,2,2)-diazabicyclo octane or a mixture of 1,4(2,2,2)-diazabicyclo octane and methylamine, in a ration R/R':0.1-infinity,
  where R is the 1,4(2,2,2)-diazabicyclo octane and R' the methylamine.

* * * * *